INVENTOR
ROBERT J. BERGMAN
BY Thomas J. Nikolai
ATTORNEY

NDRO MODE

DRO MODE

United States Patent Office 3,480,929

Patented Nov. 25, 1969

3,480,929

MULTILAYERED MATED-FILM MEMORY ELEMENT HAVING PAIRS OF LAYERS OF DIFFERING $H_k$

Robert J. Bergman, St. Paul, Minn., assignor to Sperry Rand Corporation, New York, N.Y., a corporation of Delaware Filed Sept. 27, 1967, Ser. No. 671,026
Int. Cl. G11b 5/74
U.S. Cl. 340—174 7 Claims

ABSTRACT OF THE DISCLOSURE

A magnetizable memory element that includes a plurality of layers of thin-ferromagnetic-films that are formed in a stacked, superposed relationship about and sandwiching therebetween a current conducting drive line. The magnetizable layers have opposing sides that overlap the drive line to form closely-coupled portions on both sides of the enveloped drive line for creating a substantially closed flux path about the enveloped drive line. The layers' easy axes are skewed away from the magnetic axis, i.e., a line orthogonal to the longitudinal axis, of the enveloped drive line providing single-domain rotational switching of the layers' magnetization during both the write and read operations. Pairs of layers on each side of the enveloped drive line are comprised of layers of relatively high and low $H_k$ characteristics whereby an energized enveloped drive line substantially effects only the low $H_k$ layers upon read-out providing nondestructive readout of the information stored in the high $H_k$ layers.

BACKGROUND OF THE INVENTION

The present invention is an improvement invention of the Mated-Film memory element disclosed in the copending application of K. H. Mulholland, Ser. No. 498,743, filed Oct. 20, 1965 now abandoned, and assigned to the Sperry Rand Corporation as is the present invention. The copending K. H. Mulholland application discloses a Mated-Film element that includes two thin-ferromagnetic-film layers that are formed in a stacked, superposed relationship about a suitable drive line with their overlapping sides forming closely-coupled mated-film portions creating a substantially closed flux path about the enveloped drive line. The enveloped drive line is typically a common bit and sense line used to sense the element's output during the read operation and to carry bit current during the write operation. The axis of anisotropy, or easy axis, is in the circumferential direction of the enveloped drive line, i.e., orthogonal to the longitudinal axis of the enveloped drive line, whereby the enveloped drive line provides a longitudinal drive field $H_l$ in a circumferential direction about the enveloped drive line in the area of the Mated-Film element for causing the flux in the two layers of the Mated-Film element to become aligned in an antiparallel relationship. A second drive line, preferably a printed circuit member, running over and returning under the Mated-Film element is oriented with its longitudinal axis parallel to the easy axis of the Mated-Film element whereby the enveloped drive line, when coupled by an appropriate current signal, produces a transverse drive field $H_t$ in the area of the Mated-Film element. The resulting product constitutes a memory cell that possesses all the desirable characteristics of a planar thin-ferromagnetic-film memory element while being substantially uneffected by the creep phenomenon.

SUMMARY OF THE INVENTION

The present invention is an improvement of such copending application of K. H. Mulholland in that there is provided herein a Mated-Film element wherein the thin-ferromagnetic-film layers that form the Mated-Film element may be formed in successive deposition steps of alternate layers of magnetizable material and insulating material whereby the thin-ferromagnetic-film layers that envelop the enveloped drive line may each be formed of a plurality of pairs of thin-ferromagnetic-film layers each of differing anisotropic $H_k$ characteristics thereby providing improved operating characteristics. Additionally, the present invention provides a Mated-Film element that may be formed wholly by a continuous vapor deposition process.

The thin-ferromagnetic-film layers that envelop the enveloped drive line preferably possess single-domain properties although such is not required by the present invention. The term "single-domain property" may be considered the magnetic characteristic of a three-dimensional element of magnetizable material having a thin dimension that is substantially less than the width and length thereof wherein no magnetic domain walls can exist parallel to the large surface of the element. The term "magnetizable" material shall designate a substance having a remanent magnetic flux density that is substantially high, i.e., approaches the flux density at magnetic saturation. It is desirable that each of the several thin-ferromagnetic-film layers that make up the Mated-Film element of the present invention possess such single-domain property whereby single-domain rotational switching of the magnetization of such memory element may be achieved in the manner such as described in the S. M. Rubens et al., Patent No. 3,030,612. Additionally, the memory element of the present invention is specifically directed towards the fabrication thereof in a continuous vapor deposition process such as disclosed in the S. M. Rubens et al., Patent No. 2,900,282 and Patent No. 3,155,561. However, the memory element of the present invention may be formed by any one of the plurality of well known methods of fabricating magnetizable memory elements, e.g., cathodic sputtering.

The present invention incorporates the Bicore memory element of Patent No. 3,125,743 into the multi-layered Mated-Film element of the J. M. Gorres et al., patent application Ser. No. 645,729 filed June 13, 1967, assigned to Sperry Rand Corporation as is the present invention. In the present invention the easy axes of the magnetizable layers are skewed, or rotated, out of alignment with the magnetic axis of the enveloped drive line whereby the energized drive lines cause the magnetization of the magnetizable layers to rotate in a single-domain rotational mode. The skew angle of the magnetizable layers is established, during deposition, to be equal to or greater than the dispersion angle of any of the higher $H_k$ magnetizable layers ensuring rotation of such layer's magnetic domains in the same direction upon relaxation of the write "0" signal.

The read signal $H_t$ intensity, by the energized enveloping word line, is, for NDRO operation, selected to be below the $H_k$ field of the high $H_k$ layer, and approximately equal to the $H_k$ field of the low $H_k$ layer such that the sole applied read drive field $H_t$ rotates the magnetization of the low $H_k$ layer into substantial alignment therewith for a stored "1" and to a lesser degree for a stored "0" while not substantially effecting the magnetization of the high $H_k$ layers. The $H_l+H_t$ write "1" signal intensity, by the energized enveloped and enveloping drive lines, respectively, is selected to switch the magnetization of both the high and the low $H_k$ layers into an aligned circumferential, direction, i.e., antiparallel, about the enveloped drive line. The $H_t$ write "0" signal intensity is selected to switch the magnetization of the high $H_k$ layers into the same parallel direction while permitting the high $H_k$ layers to coerce the magnetization of the associated low $H_k$ layer to become aligned anti-parallel thereto. The arrangement, upon readout, provides a signficant output signal representative of a stored "1" and an insignificant output signal representative of a stored "0." Accordingly, there is provided by the present invention an improved memory element that may be fabricated by a continuous deposition process and that is capable of operating in a single domain mode providing domain rotational switching with nondestructive readout.

Additionally, the present invention permits the fabrication of a Convertible memory system. Such a system includes an array of the memory elements of the present invention in which all or any portion thereof may be selectively operated, by electrical signals, as an NDRO memory and in which the remaining portion of such system may be selectively operated as a DRO memory. The NDRO memory portion is achieved by establishing all the memory elements thereof in their normal selective NDRO "1" or "0" stored states having the flux polarizations of FIGS. 11 or 10, respectively. The DRO memory portion is achieved by first establishing all the memory elements thereof in their normal NDRO "1" stored state having the flux polarizations of FIG. 11. Then the memory elements of the DRO memory are selectively established in DRO "1" or "0" stored states having the flux polarizations of FIG. 11 or 14, respectively. Accordingly, it is a primary object of the present invention to provide a Convertible memory system that is electrically alterable providing selective NDRO or DRO memory portions.

DESCRIPTION OF THE PREFERRED EMBODIMENTS

Figure 1:
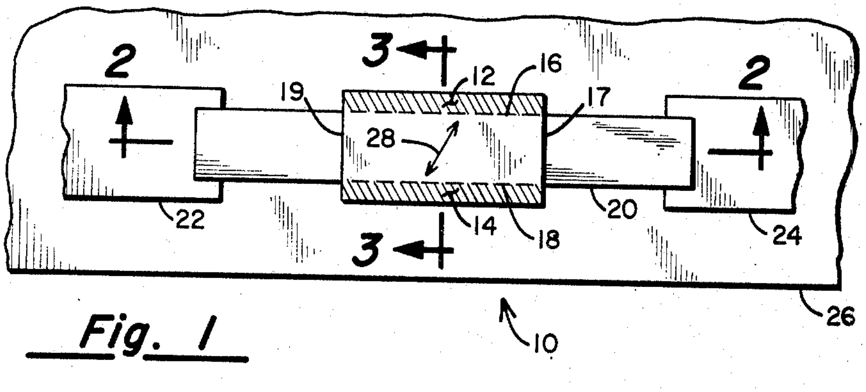
FIG. 1 is an illustration of a plan view of a Mated-Film memory element fabricated in accordance with the present invention.

With particular reference to FIG. 1 there is presented an illustration of the plan view of the Mated-Film element 10 of the present invention. As discussed in more detail in the above discussed copending patent application of K. H. Mulholland, the Mated-Film element achieves its unique operating characteristic, as compared to coupled film elements, due to the sandwiched arrangement of the thin-ferromagnetic-film layers and the enveloped common bit-sense line. The thin-ferromagnetic-film layers that are formed in a stacked, superposed relationship about the common bit-sense line have sides overlapping the enveloped bit line whereby there are formed at the overlapping sides closely-coupled Mated-Film portions of such film layers that create a substantially closed flux path about the enveloped bit line. The shaded areas defining these closely coupled mated-film areas of memory element 10 of FIG. 1 are identified by the reference numerals 12 and 14. The stacked superposed thin-ferromagnetic-film layers that form the memory portion of element 10 have the substantially rectangular form defined by the edges 16, 17, 18 and 19. Such thin-ferromagnetic-film layers sandwich therebetween a central current conductor member 20, a plurality of which in a two-dimensional array of memory elements 10 are intercoupled by the current conductor interconnecting elements 22 and 24. The entire assemblage is formed upon a suitable substrate member 26 which may be of a glass or metallic composition. Additionally, the thin-ferromagnetic-film layers are formed, during deposition, to have parallel easy axes 28 that are skewed, with respect to the magnetic axis 3—3 of the enveloped bit line 20, at an angle that is at least as large as the dispersion angle of the high $H_k$ layers.

Figure 2:
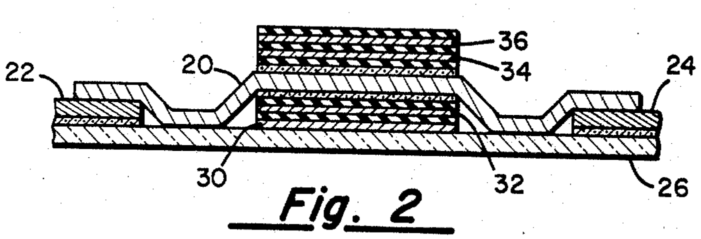
FIG. 2 is a diagrammatic illustration of a cross section of the memory element of FIG. 1 taken along line 2—2 of FIG. 1.

With particular reference to FIG. 2 there is illustrated a cross-section of element 10 taken along axis 2—2 of FIG. 1 for purposes of showing an idealized concept of the buildup of the various layers of element 10. The memory portion of element 10 is shown as consisting of two bottom layers 30 and 32 of thin ferromagnetic material and two top layers 34 and 36 of thin ferromagnetic layers; such top and bottom layers sandwiching therebetween conductor 20. The other layers illustrated in FIG. 2 but not called out therein perform no memory function but are utilized in the fabrication method of the present invention by a memory element having the most desirable characteristics for optimum fabrication and operating charactertistics.

Figure 3:
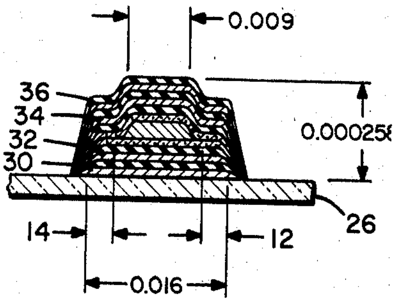
FIG. 3 is a diagrammatic illustration of a cross section of the memory element of FIG. 1 taken along line 3—3 of FIG 1.

With particular reference to FIG. 3 there is illustrated a cross-section of element 10 taken along axis 3–3 of FIG. 1 for the purpose of showing an idealized concept of the buildup of layered elements of element 10. Particularly illustrated therein are the Mated-Film portions 12 and 14 that are formed at the overlapping sides of the closely-coupled mated-film portions of thin-ferromagnetic-film layers 30, 32, 34 and 36. FIG. 3 includes some typical dimensions of element 10 for providing an appreciation of the relative size of the component parts thereof. In consideration of the above noted dimensions of element 10 it is appreciated that such illustrations are schematic only with no intention to show comparative sizes, etc.

Figure 6:
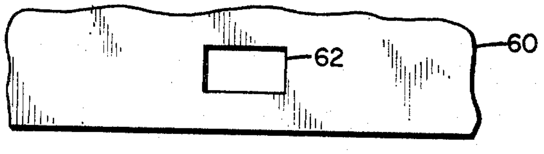
FIG. 6 is an illustration of a portion of a mask defining the outline of the thin-ferromagnetic-film layers that form the memory portion of the memory element of FIG. 1.
Figure 4:
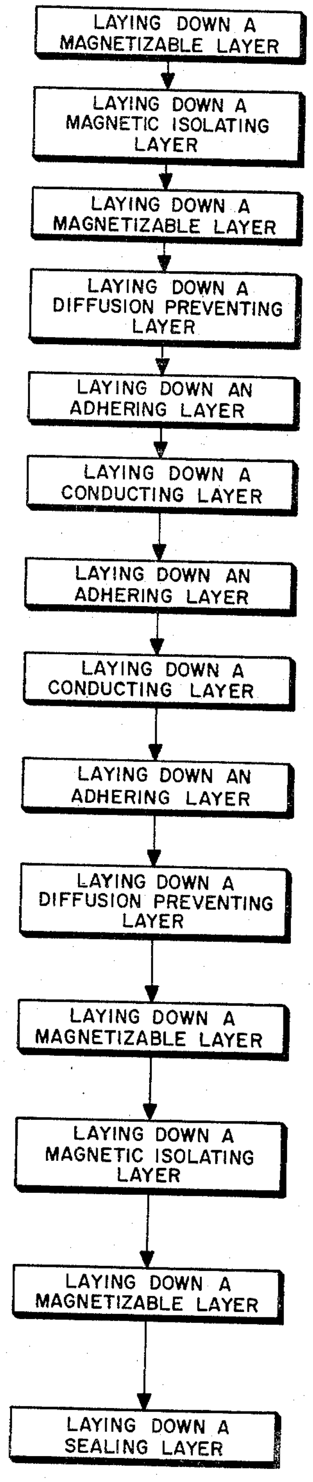
FIG. 4 is a flow diagram illustrating a typical series of steps that may be followed in preparing a memory element in accordance with the preferred technique of the present invention.
Figure 5:
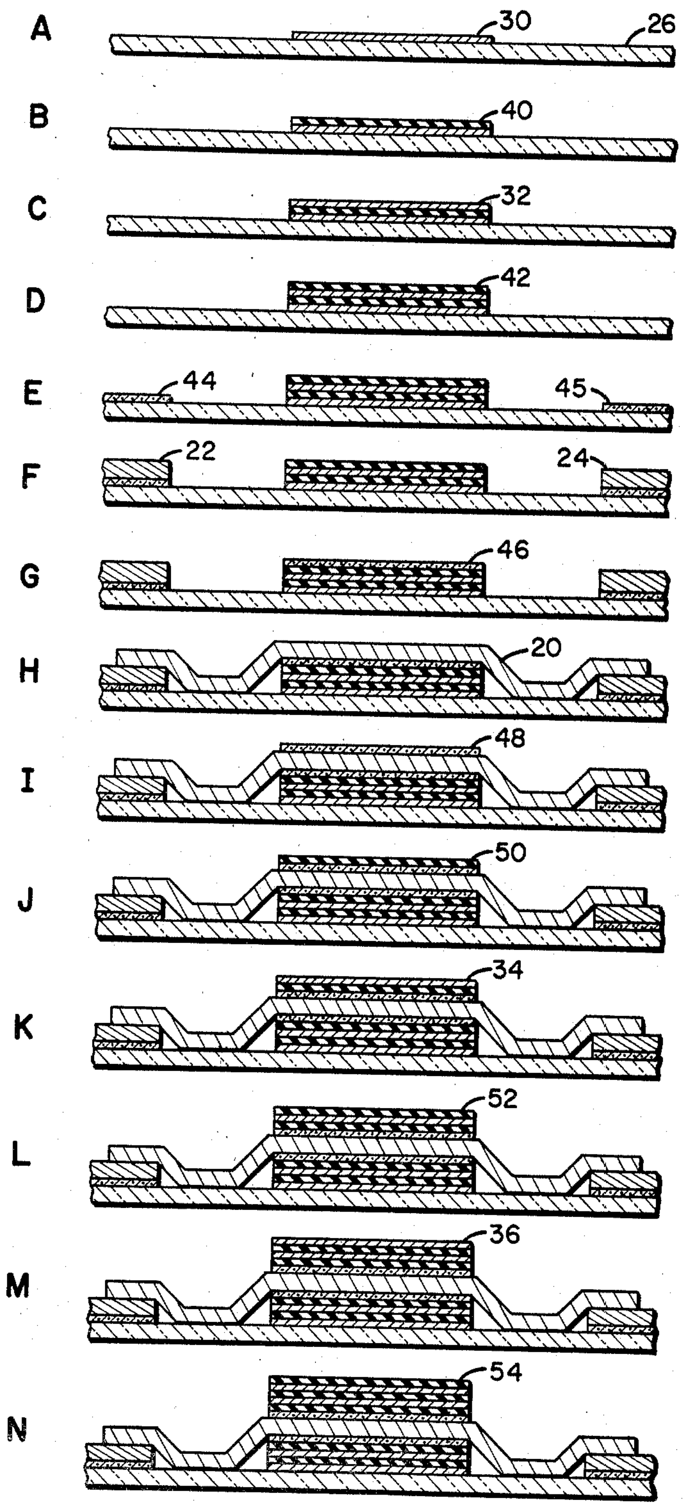
FIG. 5 is a series of views illustrating a typical production element that is under preparation in accordance with the technique of FIG. 4, the various figures illustrating the element progressively at various stages of its production and corresponding to the steps that are indicated adjacently in the flow diagram of FIG. 4.

Element 10 is composed of a plurality of stacked, superposed layers, some having a contour, or shape, that is specifically designed to permit the fabrication thereof in a continuous series of discrete deposition steps wherein there are utilized a plurality of shape defining "masks," one mask for each layer for the definition of the different layers. Discussion of an exemplary method of fabrication of the memory element proposed by the present invention shall proceed with reference to FIGS. 4 and 5. FIG. 4 illustrates a flow diagram of a series of steps that may be followed in preparing a memory element in accordance with the preferred technique of the present invention. FIG. 5 illustrates progressively the appearance of the product of the present invention during various stages of its fabrication. Each of the illustrations of FIG. 5 are located adjacent the step during which it is formed as seen in the flow chart of FIG. 4. Element 10 is formed in the following exemplary steps:

(A) The base element of element 10 is a planer glass substrate 26 of 0.006 inch in thickness that has been properly prepared for a continuous series of discrete deposition steps within an evacuatable enclosure. Additionally, substrate 26 may be of any well known materials such as a metallic base member fabricated in accordance with the copending application of B. J. Olson et al., Ser. No. 557,874, filed June 15, 1966, now Patent No. 3,392,053 and assigned to the Sperry Rand Corporation as is the present invention. Upon substrate 26, centered along axis 2—2 and about axis 3—3, is vapor deposited a single thin-ferromagnetic-film layer 30 of approximately 2,000 angstroms (A.) in thickness and approximately 81% Ni–19% Fe of an $H_k$ of approximately 4 oersteds (oe.) and having an easy axis 28 that is skewed with respect to the magnetic axis 3—3 of the to-be enveloped bit line 20 of FIG. 1. With particular reference to FIG. 6 there is illustrated a portion of mask 60 having aperture 62 therethrough for defining the contour of layer 30 when utilized in a continuous deposition process such as disclosed in the S. M. Rubens et al. Patent No. 3,155,561.

(B) Next, centered upon layer 30 of Step A above, is vapor deposited a magnetic isolating layer 40 of silicon monoxide (SiO) of 1,500 angstroms in thickness. Mask 60, as with the layer of Step A, is utilized to define the contour of layer 40.

(C) Next, centered upon layer 40 of Step B above is vapor deposited a thin-ferromagnetic-film layer 32 of approximately 2,000 angstroms in thickness and approximately 76% Ni–20% Fe–4% Co of an $H_k$ of approximately 16 oe. and having an easy axis 28. Mask 60, as with the layer of Step B above, is utilized to define the contour of layer 32.

(D) Next, centered upon layer 32 of Step B above is vapor deposited a diffusion preventing layer 42 of silicon monoxide of approximately 5,000 angstrom units in thickness. Mask 60, as with the layer of Step C above, is utilized to define the contour of layer 42.

Figure 7:
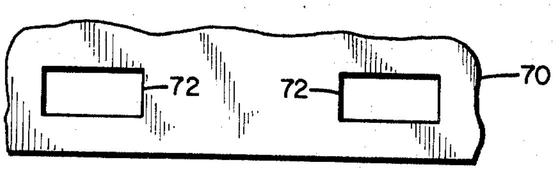
FIG. 7 is an illustration of a portion of a mask defining the outline of the current conductor interconnecting elements of the memory element of FIG. 1.

(E) Next, centered along axis 2—2 and about axis 3—3 are vapor deposited two adhering layers 44, 45 of chromium of approximately 500 angstroms in thickness. With particular reference to FIG. 7 there is illustrated a portion of a mask 70 having a plurality of apertures 72 therethrough each defining the contour of a corresponding strip 44, 45 when utilized in a continuous deposition process as discussed above.

(F) Next, upon the layers 44, 45 of Step E above, are vapor deposited two copper interconnecting strips 22 and 24 of approximately 40,000 angstroms in thickness. Mask 70, as with the layers of Step E, is utilized to define the contour of layers 22 and 24.

(G) Next, upon layer 42 of Step D above, is vapor deposited an adhering layer 46 of chromium of approximately 500 angstroms in thickness. Mask 60, as with the layer of Step D above, is utilized to define the contour of layer 46.

Figure 8:
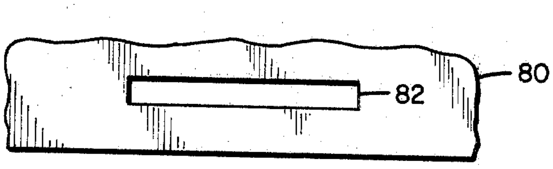
FIG. 8 is an illustration of a portion of a mask defining the outline of the current conductor intercoupling the current conductor intercoupling elements defined by the mask of FIG. 7 and which current conductor is the enveloped common bit-sense line in the memory element of FIG. 1.

(H) Next, upon layer 46 and centered along axis 2—2 and about axis 3—3 and extending over the ends of strips 22, 24 so as to form a continuous electrical circuit therewith is vapor deposited a copper line 20 of approximately 40,000 angstroms in thickness. With particular reference to FIG. 8 there is illustrated a portion of mask 80 having an aperture 82 therethrough for defining the contour of strip 20 when utilized in a continuous deposition process as discussed above.

(I) Next, centered above layer 46 of Step G above and sandwiching conductive layer 20 therebetween is vapor deposited an adhering layer 48 of chromium of approximately 500 angsrtoms in thickness. Mask 60, as with the layer of Step G above, is utilized to define the contour of layer 48.

(J) Next, centered upon layer 48 of Step I above is vapor deposited a diffusion preventing layer 50 of silicon monoxide of approximately 5,000 angstroms in thickness. Mask 60, as with the layer of Step I above, is utilized to define the contour of layer 50.

(K) Next, centered upon layer 50 of Step J above is vapor deposited a thin-ferromagnetic-film layer 34 of approximately 2,000 angstroms in thickness and approximately 81% Ni–19% Fe of an $H_k$ of approximately 4 oe. and having an anisotropic axis 28. Mask 60, as with layer 50 of Step J above, is utilized to define the contour of layer 34.

(L) Next, centered upon layer 34 of Step K above is vapor deposited a magnetic isolating layer 52 of silicon monoxide of approximately 1,500 angstroms in thickness. Mask 60, as with the layer of Step K above, is utilized to define the contour of layer 52.

(M) Next, centered upon layer 52 of Step L above, is vapor deposited a thin-ferromagnetic-film layer 36 of 2,000 angstroms in thickness and approximately 76% Ni–20% Fe–4% Co of an $H_k$ of approximately 16 oe. having an isotropic axis 28. Mask 60, as with the layer of Step L above, is utilized to define the contour of layer 36.

(N) Next, centered upon layer 36 of Step M above is vapor deposited an insulating layer 54 of silicon monoxide of approximately 2,500 angstroms in thickness. Mask 60, as with layer 36 of Step M above, is utilized to define the contour of layer 54.

It is to be appreciated that the steps A–N above are presented as an exemplary method of forming a Mated-Film memory element of the present invention; the specific dimensions, materials and order of such steps not being critical to an operative embodiment of the present invention. As stated in the copending application of K. H. Mulholland it is desirable that the magnetization M of thin-ferromagnetic-film layers 30, 32, 34 and 36 rotate in the single-domain mode as taught in the above referenced S. M. Rubens Patent No. 3,030,612. Accordingly, such layers 30, 32, 34 and 36 should possess single-domain properties as discussed in the above referenced copending patent application of R. P. Halverson. As an example, it is known that the magnetic characteristics of such thin-ferromagnetic-film layers may be effected by their differing thicknesses and the differing thicknesses of the magnetic isolating layers of silicon monoxide. As an example, the layers of Steps A, B and C above may be varied; such as forming successive depositions of a plurality of thin-ferromagnetic-film layers of 81% Ni–19% Fe of 1,000 angstroms in thickness each isolated by a magnetic isolating layer of silicon monoxide of 1,500 angstroms in thickness. This relationship of thin-ferromagnetic-film layer thickness and magnetic isolating layer thickness may be utilized to achieve thin-ferromagnetic-film layers of differing $H_c$ providing varying memory operation characteristics. Further, the alternate layers of differing magnetizable material such as the alternate layers of approximately 81% Ni-19% Fe and of approximately 76% Ni-20% Fe-4% Co may be reversed in order. Additionally, applicant has produced operative embodiments not utilizing the adhering layer of Step I; where a base member providing good adherence for the conducting layer is utilized Step E need not be utilized. Additionally, it is apparent that Steps E and G could be combined or that Steps E and F could be performed before Steps A, B, C and D.

It is known by the applicant that the insulating layers of silicon monoxide provide poor electrical insulating characteristics when element 10 is fabricated in a continuous deposition process such as disclosed in the S. M. Rubens et al. Patent No. 3,155,561 in which method the method of the present invention is particularly directed. Due to the changing environmental conditions (temperature, pressure, etc.) within the evacuatable enclosure during the deposition process and due to the irregular surfaces of the metallic layers, the layers of silicon monoxide may develop pin-hole and crack-like apertures therethrough through which the currents flowing through the enveloped bit line may short through the metallic layers. Consequently, to ensure desirable operation thereof, each element 10 in a two-dimensional array of a plurality of such elements is to be electrically insulated, by no two elements 10 having common magnetizable material, from each other whereby there is prevented the possibility of the shorting of parallel, conductive lines 22, 20, 24 in the two-dimensional array.

As stated above the layers of silicon monoxide provide poor electrical insulating characteristics. However, the layers of silicon monoxide are essential in the continuous deposition process to prevent the diffusion of the layers of magnetizable material and copper. With the magnetic characteristics of layers 30, 32, 34, 36 being critical for the proper operation of element 10 it is essential that the diffusion between such metals be prevented. Finally, although such layers of silicon monoxide cannot be relied upon to provide electrical insulating characteristics such layers are utilized to preclude contamination of the magnetizable layers during a continuous deposition process.

As the magnetizable material in the mated-film areas defined by numerals 12, 14 of FIG. 1 and FIG. 3 play little or no part in providing an output signal in bit line 20 but do provide an area of high permeability, i.e., low reluctance, to a transverse drive field $H_t$ perpendicular to the easy axis of memory element 10 that is parallel to the axis 3—3 of FIG. 1, it is desirable that the amount of magnetizable material in the mated-film areas 12, 14 be kept to a minimum such that the substantially transverse drive field $H_t$ be concentrated in the area of layers 30, 32, 34 and 36 that are continguous to bit line 20. Accordingly, it is desirable that the amount of magnetizable material in the mated-film areas defined by numerals 12 14 of FIG. 1 and FIG. 3 be kept to a minimum consistent with the requirement of producibility and operability of element 10.

Figure 9:
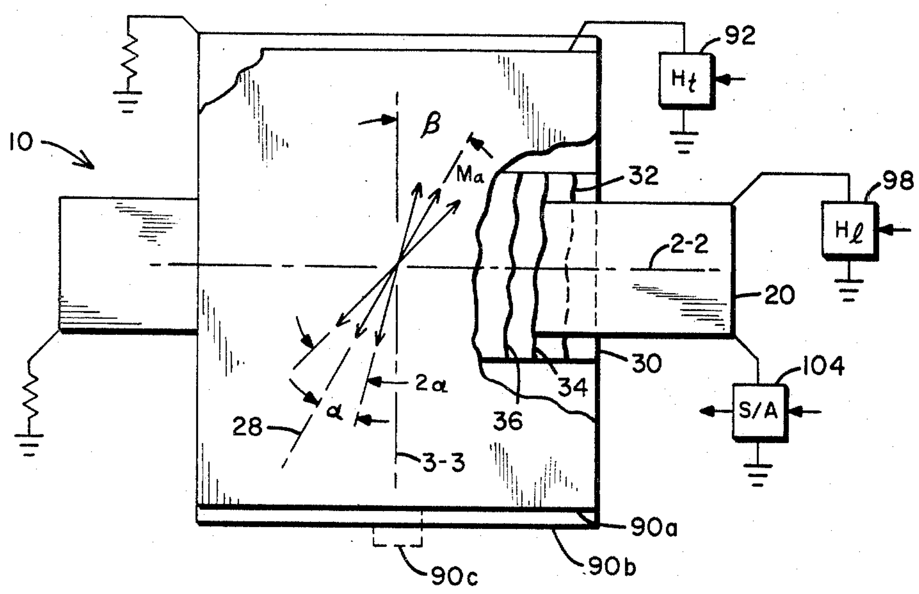
FIG. 9 is an illustration of a plan view of the Mated-Film element of the present invention including only the active elements thereof.

With particular reference to FIG. 9 there is presented a diagrammatic illustration of a plan view of a preferred embodiment of the present invention including only those active elements that are necessary for a description of the operation thereof. The embodiment of FIG. 9, over that of FIG. 1, incorporates a word line 90 comprised of top portion **90*a* and bottom portion 90*b* intercoupled at one end by a conductive member 90*c* providing a word line that envelops element 10. The other components are as previously discussed in more detail with particular reference to FIGS. 1–3. As previously discussed, element 10 includes an eveloped common sense-bit line 20 and the enveloping thin-ferromagnetic-film layers 30, 34 of a low $H_k$ characteristic and layers 32, 36 of a high $H_k$ characteristic with the orienting longitudinal axis 2—2 and orthogonal magnetic axis 3—3 of conductive member 20. Layers 30, 32, 34 and 36, each having a dispersion angle generally described by angle $\alpha$ are formed during the deposition process with their mean, or easy, axis $M_a$ skewed with respect to axis 3—3 an angle $\beta$ that is at least as great as the angle $\alpha$. Orienting the easy axis $M_a$, noted as axis 28 in FIGS. 1 and 9, at an angle $\beta$ that is at least as large as the dispersion angle $\alpha$ of layers 32, 36** ensures rotation of the magnetization of such layers in a common direction upon relaxation of the write "0" signals.

Figure 10:
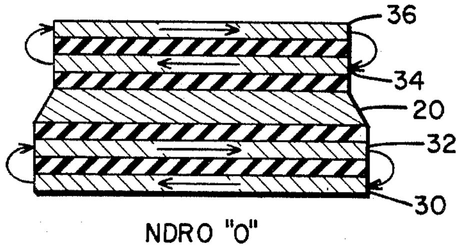
FIG. 10 is an illustration of the flux orientation for an NDRO stored "0" in a stylized conceptualization of a cross section of the memory element of FIG. 10 taken along axis 28.
Figure 11:
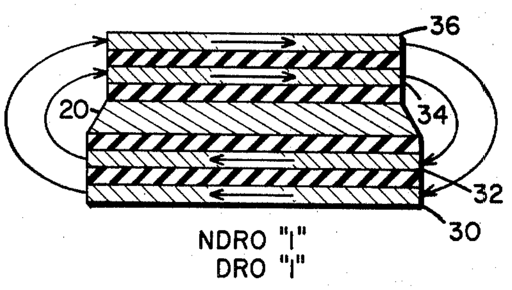
FIG. 11 is an illustration of the flux orientation for both an NDRO stored "1" and a DRO stored "1" in a stylized conceptualization of a cross section of the memory element of FIG. 10 taken along axis 28.
Figure 14:
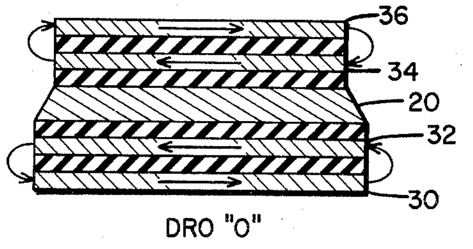
FIG. 14 is an illustration of the flux orientation for a DRO stored "0" in a stylized conceptualization of a cross section of the memory element of FIG. 10 taken along axis 28.
Figure 12:
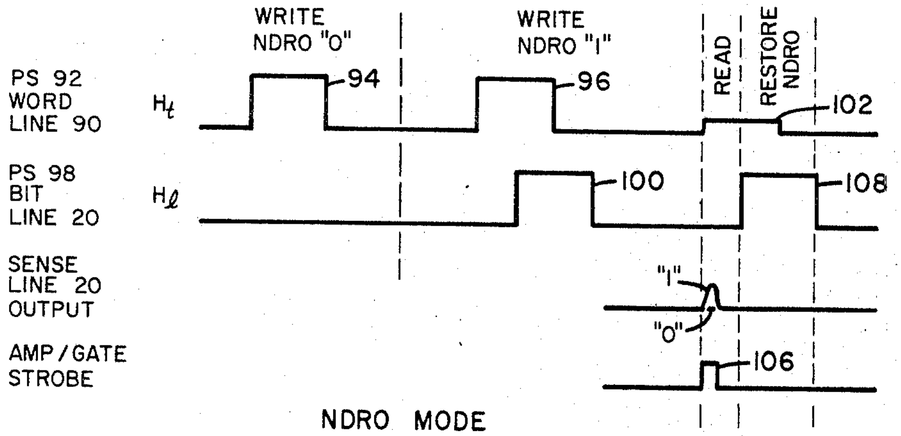
FIG. 12 is an illustration of the timing signal relationships associated with the NDRO reading and writing operations of the memory element of FIG. 9.
Figure 13:
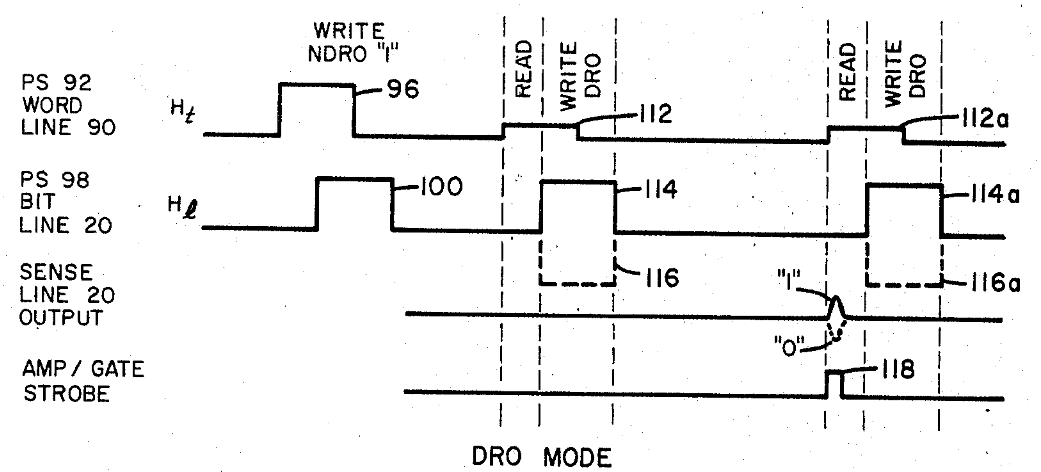
FIG. 13 is an allustration of the timing signal relationships associated with the DRO reading and writing operations of the memory element of FIG. 9.

Operation of the embodiment of FIG. 9 in the NDRO mode shall be discussed with particular reference to FIGS. 10, 11 and 12. FIG. 12 is an illustration of the timing relationships associated with the preferred write NDRO "0," write NDRO "1" and NDRO read signals while FIGS. 10 and 11 are illustrations of the flux orientation along axis 28 for the NDRO "0" and NDRO "1" stored states, respectively. Subsequently, operation of the embodiment of FIG. 9 in the DRO mode shall be discussed with particular reference to FIGS. 11, 13 and 14. FIG. 13 is an illustration of the timing relationships associated with preferred write DRO "0," write DRO "1" and DRO read signals while FIGS. 14 and11 are illustrations of the flux orientations along axis 28 for the DRO "0" and DRO "1" stored states, respectively.

NDRO OPERATION

Operation of the embodiment of FIG. 9 for a write NDRO "0" operation is initiated by pulse source 92 coupling a pulse 94 to the enveloping word line strap 90. Pulse 94 provides, in the area of the magnetizable layers, a magnetic field of an intensity that is substantially equal to the $H_k$ of the high $H_k$ layers and of a direction that is substantially parallel to axis 2—2. This magnetic field is substantially transverse to the main magnetic axis 28, or $M_a$, of the magnetizable layers, and thus might be considered to be a transverse drive field $H_t$. The application of drive field 94 to element 10 causes the magnetization of layers 30, 32, 34 and 36 to become substantially aligned with axis 2—2 toward the right as determined by its polarity. Upon the removal of drive field 94 the magnetization of the high $H_k$ layers 32, 36 falls back along axis 28 in the upward direction due to the skew angle $\beta$ providing a preferred direction of rotation. Correspondingly, the rotation of the magnetization of the high $H_k$ layers 32 and 36 into their upward orientation along axis 28 provides, in the areas of the associated low $H_k$ layers 30 and 34, respectively, an external field that coerces the magnetization of the associated high and low $H_k$ layers to become aligned in a antiparallel relationship, i.e., the associated layers 30, 32 and 34, 36 close the otherwise open flux paths of each other. This NDRO "0" stored flux orientation is diagrammatically illustrated in FIG. 10.

Operation of the embodiment of FIG. 9 for the write NDRO "1" operation is initiated by pulse source 92 coupling a pulse 96 to the enveloping word line strap 90. Pulse 96, which may be similar to pulse 94 of the word NDRO "0" operation, provides, in the area of the area of the magnetizable layers, a magnetic field of an intensity substantially equal to the $H_k$ of the high $H_k$ layers and of a direction substantially parallel to axis 2—2. Magnetic field 96, as is magnetic field 94, is substantially transverse to the mean magnetic axis 28 of the magnetizable layers, and thus might be considered to be a transverse drive field $H_t$. The application of the drive field 96 to element 10 causes the magnetization of layers 30, 32, 34 and 36 to become substantially aligned with axis 2—2 toward the right as determined by its polarity. Subsequently, and during the occurrence of the application of pulse 96 to word line strap 90, pulse source 98 couples pulse 100 to the enveloped bit-sense line 20 whereby there is provided in the area of layers 30, 32, 34 and 36 a drive field that is oriented parallel to axis 3—3. As axis 3—3 is substantially longitudinal, or parallel, with respect to axis 28 of such magnetizable layers, drive field 100 may be considered to be a longitudinal drive field $H_l$.

The combination of drive fields 96 and 100 causes the magnetization of the magnetizable layers to become biased away from axis 2—2 as determined by the polarity of the resulting, or effective, drive fields in the area of the particular magnetizable layer. With the particular polarity of drive field 100 utilized it is apparent that the magnetization of layers 30, 32 becomes biased in a downward direction, i.e., toward the bottom edge of FIG. 9, with respect to axis 2—2 while the magnetization of layers 34, 36 becomes biased in an upward direction with respect to axis 2—2. Subsequently, when drive field 96 is terminated the still applied drive field 100 steers the magnetization of the magnetizable layers into the upward or downward direction along axis 28 as determined by the polarity of the resulting drive field 100 in the area of the particular magnetizable layer. Thus, with drive field 96 terminated and drive field 100 maintained the magnetization of layers 30, 32 is steered into a downward direction along axis 3—3 while the magnetization of layers 34, 36 is steered into an upward direction along axis 3—3. Subsequently, when drive field 100 is removed the magnetization of layers 30, 32 resides in a downward direction along axis 28 while the magnetization of layers 34, 36 resides in the upward direction along axis 28. In this arrangement each pair of associated high and low $H_k$ layers close the otherwise open flux paths of the other pair with the magnetization of the two pairs of associated magnetizable layers aligned in an antiparallel relationship. This NDRO "1" stored flux orientation is diagrammatically illustrated in FIG. 11.

For the NDRO read operation pulse source 92 couples a pluse 102 to the enveloping word line strap 90. Pulse 102 provides, in the area of the magnetizable layers, a magnetic field of an intensity approximately one-fourth that provided by pulse 94, or 96, which intensity is insufficient to substantially effect, i.e., rotate away from axis 28, the magnetization of the high $H_k$ layers 32, 36 when in either the NDRO "1" or NDRO "0" stored state. However, drive field 102 is sufficient to substantially effect the magnetization of the low $H_k$ layers 30, 34 when in an NDRO "1" stored state, but is insufficient to substantially effect the magnetization of the low $H_k$ layers 30, 34 when in an NDRO "0" stored state. Accordingly, the NDRO read operation, upon the application of drive field 102, couples a signficant read NDRO "1" output signal or an insignificant read NDRO "0" output signal to sense amplifier/gate 104. By coupling a strobe, or gate, pulse 106 to sense amplifier/gate 104 at a time during the application of drive field 102 to element 10, distinguishable read NDRO "1" or read NDRO "0" output signals may be emitted therefrom. After the application of drive field 102 and concurrent therewith, pulse source 98 unconditionally, i.e., irespective of whether element 10 is in an NDRO "1" or an NDRO "0" stored state, couples pulse 108 to the enveloped bit line 20 ensuring the resetting of the switched low $H_k$ layers in the NDRO "1" stored state back into their original polarizations. This unconditional application of the pulse 108 steering field is similar to the resetting operation of conventional Transfluxor operation and is, accordingly considered NDRO operation.

DRO OPERATION

Operation of the embodiment of FIG. 9 for the write DRO operation is initiated by establishing memory element 10 into the above described normal NDRO "1" stored state having the flux polarization of FIG. 11. This NDRO "1" stored state may be considered to be a preliminary step in the write DRO operation of element 10. Operation of the embodiment of FIG. 9 for the DRO read-write (restore) memory cycle is initiated by pulse source 92 coupling a pulse 112 to the enveloping word line strap 90. Pulse 112, which may be similar to pulse 102 of the NDRO operation, provides, in the area of the magnetizable layers, a magnetic field of an intensity approximately one-fourth that provided by pulse 96, which intensity is insufficient to substantially effect, i.e., rotate away from axis 28, the magnetization of the high $H_k$ layers 32, 36 in the priorly established NDRO "1" stored state. With no DRO stored state having been established in memory element 10 by a prior write DRO operation no relative information is detected by sense line 20 and accordingly no strobe pulse is coupled to sense amplifier/gate 104 during this read cycle.

The write DRO operation is initiated by pulse source 98 coupling, concurrent with pulse source 92 coupling pulse 112 to bit line 20, either pulse 114 or pulse 116, of equal amplitude but of a first or a second and opposite polarity, for the writing of a DRO "1" or a DRO "0," respectively, to word line strap 90. Drive fields 114, 116 are in the preferred embodiment of the present invention of the same intensity in the area of magnetizable layers as is drive field 100 of the write NDRO "1" operation. As drive field 112 is, in the area of the magnetizable layers, of an insufficient intensity to substantially effect the magnetizaiotn of the high $H_k$ layers but is of a sufficient intensity to substantially effect the magnetization of the low $H_k$ layers, the concurrent application of $H_t$ drive field 112 and of $H_l$ drive field 114 or 116 to the magnetizable layers causes the magnetization of the low $H_k$ layers to become substantially aligned along the axis 3—3 as determined by the polarity of the applied drive field 114 or 116. However, the magnetization of the high $H_k$ layers is only slightly rotated out of alignment with its easy axis 28 in the polarities of the prior NDRO "1" stored state. Subsequently, when drive field 112 is removed with the magnetization of the high $H_k$ layers 32 and 36 returns into substantial alignment with axis 3—3 having the upward and downward, respectively flux polarities of the priorly established NDRO "1" stored state of FIG. 11 (and of FIG. 14).

Upon the removal of drive fields 114 or 116 from the magnetizable layers of memory element 10 the magnetization of the high $H_k$ layers 32, 36 falls back along axis 28 in the downward and upward directions, respectively, of FIG. 14 (and FIG. 11). Correspondingly, the rotation of the magnetization of the high $H_k$ layers 32 and 36 into their downward and upward orientations, respectively, along axis 28 provides in the areas of the associated low $H_k$ layers 30 and 34, respectively, and external field that coerces the magnetization of the associated high and low $H_k$ layers to become aligned in an antiparallel relationship, i.e., the associated layers 30, 32 and 34, 36 close the otherwise open flux paths on each other. This DRO "0" stored flux orientation is diagrammatically illustrated in FIG. 14.

It is to be noted that as between the DRO "1" and DRO "0" stored states of FIGS. 11 and 14, respectively, the antiparallel flux polarization of the high $H_k$ layers 32, 36 of the DRO "1" and "0" stored states are the same being that of the priorly established NDRO "1" stored state while the flux polarizations of the low $H_k$ layers 30, 34 are reversed for the DRO "0" stored state forming closed flux paths for the otherwise open flux paths of the associated high $H_k$ layers. Further, as between the NDRO "1" and NDRO "0" stored states of FIGS. 11 and 10 the antiparallel flux polarizations of the high $H_k$ layers of the NDRO "1" stored state is reversed for the NDRO "1" stored state into a parallel flux polarization while the flux polarization of the low $H_k$ layers are caused to form closed flux paths for the otherwise open flux paths of the associated high $H_k$ layers.

With memory element 10 having been established in a DRO "1" or DRO "0" stored state by the above described DRO write operation the next subsequent read-write (restore) memory cycle will read out the stored, or informational, state of the effected memory element 10 and write new information into the affected memory element 10 or restore the informational content of the memory element 10 destroyed during the immediately prior read operation. The DRO read-write memory cycles utilize similar pulse signals, and, accordingly, like current signal pulses and the resulting drive fields have been assigned the same reference number with the addition of a lower case letter suffix for each subsequent DRO read-write memory cycle.

For the next subsequent DRO read operation pulse source 92 couples a pulse 112*a* to the enveloping word line strap 90. Drive field 112*a*, as described above, has a substantial effect upon the low $H_k$ layers during the DRO read operation of the memory element 10 wherein there is induced in sense line 20 similar but opposite polarity output signals indicative of the readout of a DRO "1" or DRO "0" stored state. Upon the application of drive field 112*a* to memory element 10 a strobe pulse 118 is coupled to sense amplifier/gate 104 permitting sense amplifier/gate 104 to emit distinguishable read DRO "1" or read DRO "0" output signals therefrom.

For the associated DRO write operation pulse source 98, concurrent with pulse source 92 coupling pulse 112*a* to word line strap 90, couples pulse 114*a* for the writing of a DRO "1" or pulse 116*a* for the writing of a DRO "0" in memory element 10. Drive fields 114*a* or 116*a* establish the flux polarizations of the magnetizable layers of memory element 10 substantially along their respective easy axes 28 as described above. Upon the termination of drive fields 114*a* or 116*a* the magnetization of the magnetizable layers of memory element 10 assume the DRO "1" or DRO "0" stored state flux polarizations of FIGS. 11 or 14, respectively, as described in detail above.

CONVERTIBLE MEMORY OPERATION

Figure 15:
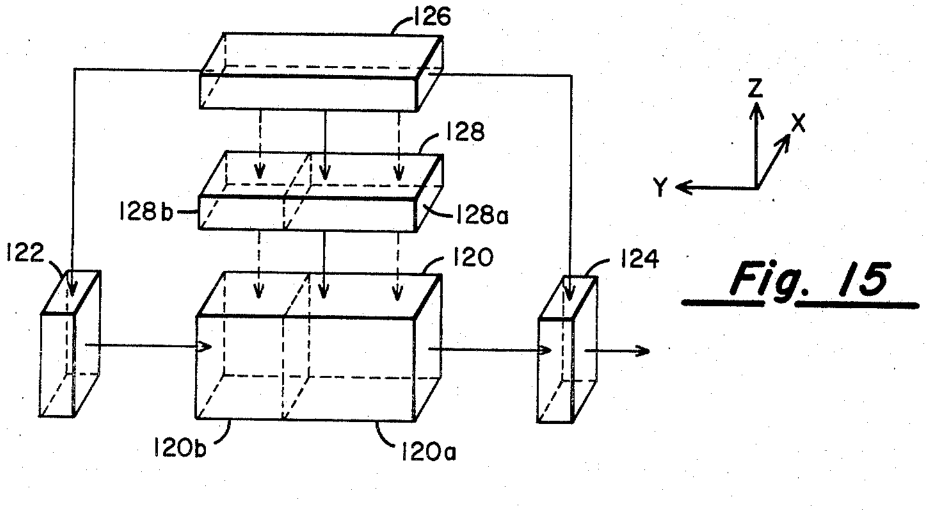
FIG. 15 is an illustration of a block diagram of a Convertible memory system proposed by the present invention.

With particular reference to FIG. 15 there is presented an illustration of a block diagram of a Convertible memory system proposed by the present invention. The organization of the Convertible memory 120 may be that of any one of many well known systems. However, for purposes of the present discussion memory 120 may be considered to be similar to that of the R. J. Bergman et al., patent application, Ser. No. 504,543, filed Oct. 24, 1965 now Patent No. 3,435,435 and assigned to the Sperry Rand Corporation as is the present invention. In this arrangement the memory elements 10 are arranged in a plurality of two-dimensional planar arrays each in its associated XY plane with a plurality of such arrays stacked in the Z dimension. All of the two-dimensional planar arrays of memory 120 are substantially similar with the memory elements 10 thereof oriented in like geometrical arrays whereby a single word line passing in the Z dimension through memory 120 couples one like-ordered memory element 10 in each plane, with all the like-ordered memory elements 10 of the plurality of planar arrays coupled by one word line. These word lines may be as described in the above referenced Patent 3,435,435. Accordingly, memory 120 is to be considered to be a word-organized memory whereby the coupling of an appropriate signal to a single word line effects the readout of the stored states of the associated memory elements 10. Each two-dimensional array may be assumed to include a single common bit-sense line 20 coupled on one end to the bit driver selector 122 and on the other end to the sense amplifier/gate selector 124. Accordingly, with each two-dimensional array having an associated sense line, an appropriate read signal coupled to the one selected word line induces output signals in the associated sense lines, one sense line for each plane, which output signals are coupled to sense amplifier/gate selector 124. The writing operation is as described above whereby memory controller 126 couples appropriate signals to bit driver selector 122 and/or word driver selecter 128 for establishing the effected memory elements 10 into their appropriate informational, i.e., data, states.

The method of operating memory 120 as a Convertible memory system consists of operating a first portion 120*a* as an NDRO memory and a second portion 120*b* as a DRO memory. This method comprises selectively establishing the memory elements 10 of the first portion 120*a* in an NDRO "1" stored state or in an NDRO "0" stored state, establishing all the memory elements 10 of the second portion 120*b* in an NDRO "1" stored state and then selectively established the memory elements 10 of the second portion 120*b* in a DRO "1" stored state or in a DRO "0" stored state. Operation of memory system 120 as a Convertible memory system is as described above utilizing the signal timing relationships of the NDRO mode of FIG. 12 and the DRO mode of FIG. 13.

It is to be realized that as the memory elements 10 of the memory 120 may be operated in the NDRO mode or in the DRO mode all or any portion of memory 120 may be operated in one or the other of the NDRO or DRO modes. However, for purposes of the present discussion assume that portion 120*a* of memory 120 is to be operated in the NDRO mode as a NDRO memory and that portion 120*b* of memory 120 is to be operated in the DRO mode as a DRO memory. Accordingly, for purposes of this illustration word driver selector 128 may be assumed to consist of an analogous NDRO word driver first portion 128*a* and DRO word driver second portion 128*b*. It being understood that such first portion 128*a* and second portion 128*b* are not separate physical entities but are merely operated electrically differently for the appropriate current signal timing relationships such as discussed above with respect to FIGS. 12 and 13. Initially, memory controller 126 couples the appropriate control signals to NDRO word driver portion 128*a* and to bit driver selector 122 whereby the memory elements 10 of the NDRO memory portion 120*a* are selectively established in an NDRO "1" stored state or in an NDRO "0" stored state. Next, memory controller 26 couples the appropriate control signals to NDRO word driver portion 128*b* and to bit driver selector 122 whereby all the memory elements 10 of DRO memory portion 120*a* are established in an NDRO "1" stored state. Next, memory controller 126 couples the appropriate control signals to DRO word driver portion 128*b* and to bit driver selector 122 for selectively establishing the memory elements 10 of DRO memory 120*b* in a DRO "1" stored state or in a DRO "0" stored state. This NDRO and DRO write operation is as previously discussed with particular reference to FIGS. 12 and 13.

With NDRO memory 120*a* and DRO memory 120*b* loaded with digital information in accordance with well known programming techniques the informational content of NDRO memory 120*a* or DRO memory 120*b* may be read out by conventional methods using the signal timing relationships of FIGS. 12 and 13, respectively. Upon read out, each two-dimensional array of NDRO memory 120*a* or DRO memory 120*b* couples to sense amplifier/gate 124, by means of an associated sense line 20, the information associated with the addressed word line as determined by word driver selector 128. Memory controller 126 couples the appropriate gating pulse to sense amplifier/gate 124 whereby all the bits of the addressed word in Convertible memory 120 are read out in parallel from sense amplifier/gate 124.

Although the illustrated embodiment of FIG. 9 utilizes an enveloping word line strap 90 having substantially planar portions that are parallel to the planes of the magnetizable layers 30, 32, 34 and 36 it is to be appreciated that an arrangement utilizing intercoupled enveloping word lines having their physical, or longitudinal axes perpendicular to the planes of such magnetizable layers, such as illustrated in the Patent 3,435,435 may be utilized. Thus, it is apparent that there has been described and illustrated herein a preferred embodiment of the present invention that provides a method for producing an improved memory element. It is understood that suitable modifications may be made in the structure as disclosed provided that such modifications come within the spirit and scope of the appended claims. Having, now, fully illustrated and described my invention, what I claim to be new and desire to protect by Letters Patent is set forth in the appended claims.

I claim:

1. The method of establishing a magnetizable memory element in one of a plurality of stored states, said memory element including superposed pairs of thin-ferromagnetic-film layers each pair of layers including a relatively high $H_k$ layer and a relatively low $H_k$ layer, a bit and sense line sandwiched between and enveloped by said pairs of layers for coupling substantially longitudinal drive fields to said layers along a sense magnetic axis and for detecting output signals indicative of the particular stored state of said memory element, a word line for coupling substantially transverse drive fields to said layers along a drive magnetic axis that is substantially orthogonal to said sense magnetic axis, said layers having substantially parallel easy axes along which their remanent magnetization shall lie, said parallel easy axes skewed with respect to said sense magnetic axis an angle that is at least as great as the dispersion angle of the high $H_k$ layers, the method comprising:

establishing said memory element in an NDRO "0" stored state by;

coupling a current pulse to said word line for establishing in the areas of said layers a first transverse drive field of a first polarity along said drive magnetic axis;

said first transverse drive field establishing the flux polarizations of the layers of each pair in an antiparallel relationship and the flux polarizations of the high $H_k$ layers of each pair in a parallel relationship establishing said memory element in an NDRO "0" stored state;

establishing said memory element in an NDRO "1" stored state by;

coupling a current pulse to said word line for establishing in the areas of said layers a second transverse drive field of a first polarity along said drive magnetic axis;

coupling a current pulse to said bit line for establishing in the areas of said layers a first longitudinal drive field of a first polarity along said sense magnetic axis and of an intensity when combined with said second transverse drive field sufficient to bias the magnetization of the first pair of layers in a first direction away from said drive magnetic axis and sufficient to bias the magnetization of the second pair of layers in a second direction, opposite from said first direction, away from said drive magnetic axis;

terminating said second transverse drive field for permitting said still applied first longitudinal drive field to steer the magnetization of said layers in said first or second direction substantially along said sense magnetic axis;

terminating said first longitudinal drive field for permitting the magnetization of said layers to reside in said first or second direction substantially along said easy axes;

said combination of said second transverse drive field and said first longitudinal drive field establishing the flux polarizations of the layers of each pair in a parallel relationship and the flux polarizations of the high $H_k$ layers of each pair in an antiparallel relationship establishing said memory element in an NDRO "1" stored state.

2. The method of claim 1 further including establishing said memory element in a DRO "1" or DRO "0" stored state by:

establishing said memory element in said NDRO "1" stored state;

coupling a current pulse to said word line for establishing in the areas of said layers a third transverse drive field of a first polarity along said drive magnetic axis;

said third transverse drive field substantially biasing the magnetization of said low $H_k$ layers away from said easy axes but insubstantially biasing the magnetization of said high $H_k$ layers away from said easy axes;

coupling a current pulse of a first or of a second and opposite polarity to said bit line for establishing in the areas of said layers a second longitudinal drive field of a first or of a second and opposite polarity along said sense magnetic axes and of an intensity when combined with said third transverse drive field sufficient to substantially effect the magnetization of said low $H_k$ layers but insufficient to substantially effect the magnetization of said high $H_k$ layers;

terminating said third transverse drive field for permitting said still applied second longitudinal drive field of said first or second polarity to bias the magnetization of said low $H_k$ layers in a first or a second and opposite direction, respectively, substantially along said sense magnetic axis;

terminating said second longitudinal drive field for permitting the magnetization of said low $H_k$ layers to reside in said first or second direction substantially along said easy axes;

said combination of said third transverse drive field and said first polarity second longitudinal drive field establishing the flux polarizations of the layers of each pair in a parallel relationship and the flux polarizations of the high $H_k$ layers of each pair in an antiparallel relationship establishing said memory element in a DRO "1" stored state;

said combination of said third transverse drive field and said second polarity longitudinal drive field establishing the flux polarizations of the layers of each pair in an antiparallel relationship and the flux polarizations of the high $H_k$ layers of each pair in an antiparallel relationship establishing said memory element in a DRO "0" stored state.

3. The method of claim 1 further including reading out the NDRO stored state of said memory element, comprising:

coupling a current pulse to said word line for establishing in the areas of said layers a fourth transverse drive field of a first polarity along said drive magnetic axis;

said fourth transverse drive field substantially effecting the magnetization of said low $H_k$ layers but insubstantially effecting the magnetization of said high $H_k$ layers;

detecting the NDRO stored state of said memory element during the application of said fourth transverse drive field as a significant or insignificant output signal in said sense line indicative of the readout of an NDRO "1" stored state or of an NDRO "0" stored state, respectively;

after said read operation unconditionally coupling a current pulse to said bit line for establishing in the areas of said layers a third longitudinal drive field of a first polarity along said sense magnetic axis and of an intensity when combined with said fourth transverse drive field sufficient to substantially effect the magnetization of said low $H_k$ layers but insufficient to substantially effect the magnetization of said high $H_k$ layers for restoring the flux polarizations of said low $H_k$ layers into their prior NDRO "1" stored state or their prior NDRO "0" stored state.

4. The method of claim 2 further including reading out the DRO stored state of said memory element, comprising:

detecting the DRO stored state of said memory element during the application of said third transverse drive field as a first or a second and opposite polarity output signal in said sense line indicative of the readout of a DRO "1" stored state or of a DRO "0" stored state, respectively.

5. The method of claim 1 wherein said first and second transverse drive fields are of an intensity, in the areas of said layers, substantially equal to the $H_k$ of the high $H_k$ layers.

6. The method of claim 2 wherein said third transverse drive field is of an intensity, in the areas of said layers, substantially one-fourth the $H_k$ of the high $H_k$ layers.

7. The method of claim 3 wherein said fourth transverse drive field is of an intensity, in the areas of said layers, substantially one-fourth the $H_k$ of the high $H_k$ layers.

References Cited

UNITED STATES PATENTS

| | | | |
|---|---|---|---|
| 3,125,745 | 3/1964 | Oakland | 340—174 |
| 3,231,874 | 1/1966 | James | 340—174 |
| 3,355,725 | 11/1967 | McKeon | 340—174 |
| 3,427,600 | 2/1969 | Middelhock | 340—174 |
| 3,440,625 | 4/1969 | Weinstein | 340—174 |

OTHER REFERENCES

IBM Technical Disclosure Bulletin, "Coupled-Film Device With Minimum Stray Fields," by Keefe et al., vol. 8, No. 11 April 1966, page 1612.

STANLEY M. URYNOWICZ, Jr., Primary Examiner

U.S. Cl. X.R.

117—71